Patented July 15, 1947

2,424,062

UNITED STATES PATENT OFFICE 2,424,062

2-METHOXY-6-CHLORO-9-[4'-(DIISOPROPYLAMINO)-BUTYLAMINO]-ACRIDINE

Horace A. Shonle and Joseph W. Corse, Indianapolis, Ind., assignors to Eli Lilly and Company, Indianapolis, Ind., a corporation of Indiana No Drawing. Application July 29, 1944, Serial No. 547,304

1 Claim. (Cl. 260—279)

This invention relates to certain new 2-methoxy-6-chloro-9-[4'-(symmetrical disubstituted amino)butylamino] acridines and their salts, having antimalarial value; to certain new intermediates used in making them; and to the process of producing these new compounds.

The new substituted acridines have the following general formula:

(1)
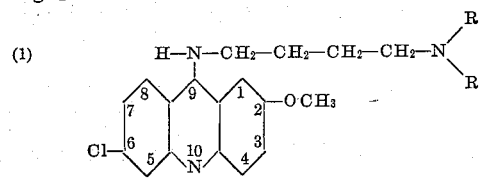

in which R in both instances represents the same saturated atertiary (primary or secondary) hydrocarbon radical having from 3 to 7 carbon atoms.

Examples of the hydrocarbon radicals which R may represent are the following:

n-Propyl, isopropyl, and cyclopropyl
n-Butyl, isobutyl, secondary butyl, and cyclobutyl
n-Pentyl, its atertiary isomers, and cyclopentyl
n-Hexyl, its atertiary isomers, and cyclohexyl
n-Heptyl, its atertiary isomers, and cycloheptyl The general process of preparing the new substituted acridines and intermediates is as follows:

1. The starting compound is a secondary amine having the formula:

(2)

in which R has the same meaning as before. This secondary amine is used, as by condensing it with 4-chlorobutyronitrile, to prepare an aminonitrile of the following formula:

(3)
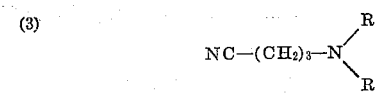

in which R has the same meaning as before.

2. This aminonitrile is reduced, as with hydrogen and a catalyst under pressure and heat or by treating an alcohol solution with sodium, to a diamine of the following formula:

(4)
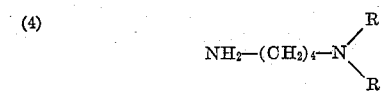

in which R has the same meaning as before.

3. This diamine is then condensed with 2-methoxy-6,9-dichloroacridine, in phenol, to produce the desired 2-methoxy-6-chloro-9-[4'-(disubstituted amino)butylamino] acridine. This is liberated by making the reaction mixture alkaline, as with dilute sodium hydroxide solution, and is recovered with ether. It may be converted to a salt; for example, treatment of the ether solution with hydrogen chloride produces the dihydrochloride as a precipitate.

The following are examples of our new products, and of the process of producing them.

*Example 1.*—2-methoxy-6-chloro-9-[4'-diisopropylamino)butylamino]acridine, and its dihydrochloride.

A mixture of 100 g. of diisopropylamine, 50 g. of 4-chlorobutyronitrile, and 3 g. of potassium iodide is heated in an oil bath at 105–110° C. for five days. The reaction mixture is then vacuum distilled, and yields 57 g. of 4-(diisopropylamino) butyronitrile, boiling at 124–127° C. at 33 mm. pressure, which has the following formula:

(5)
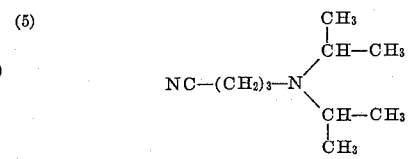

A solution of 33.4 g. of this aminonitrile in 400 cc. of absolute alcohol is heated to boiling, and 30 g. of sodium is rapidly added. Vacuum distillation of the reaction mixture yields 16.5 g. of 4-(diisopropylamino) butylamine, boiling at 110–112° C. at 28 mm. pressure, which has the following formula:

(6)
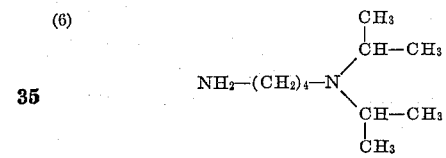

A mixture of 8.6 g. of this diamine, 12.5 g. of 2-methoxy-6,9-dichloroacridine, and 55 cc. of phenol is stirred and heated on a steam bath for two hours. The reaction mixture is made alkaline with dilute sodium hydroxide solution, which liberates as a free base the desired 2-methoxy-6-chloro-9-[4'-(diisopropylamino)butylamino] acridine, which has the following formula:

(7)
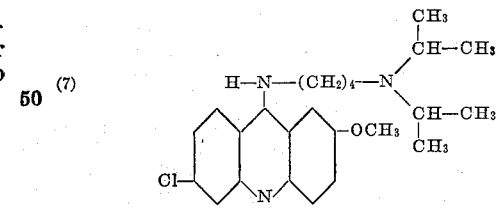

This substituted acridine is recovered from the reaction mixture by extraction with ether, and may be separated from the ether by distillation. Its dihydrochloride is precipitated by treating the ether solution with hydrogen chloride. The dihydrochloride melts at 240–242° C.

*Example 2.*—2-methoxy-6-chloro-9-[4'-(di-n-butylamino)butylamino]acridine and its dihydrochloride.

Example 1 is repeated, save that as the starting secondary amine we use di-n-butylamine; and successively obtain the following compounds:
a. 4-(di-n-butylamino)butyronitrile
b. 4-(di-n-butylamino)butylamine
c. 2-methoxy-6-chloro-9-[4'-(di-n-butylamino)butylamino]acridine, which has the following formula:

(8)
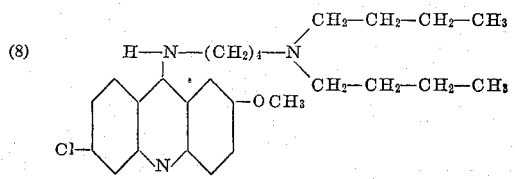

d. The dihydrochloride of c.

*Example 3.*—2-methoxy-6-chloro-9-[4'-(diisoamylamino)butylamino]acridine and its dihydrochloride.

Example 1 is repeated, save that as the starting secondary amine we use diisoamylamine; and successively obtain the following compounds:
a. 4-(diisoamylamino)butyronitrile
b. 4-(diisoamylamino)butylamine
c. 2 - methoxy - 6 - chloro - 9 - [4' - (diisoamylamino)butylamino]acridine, which has the following formula:

(9)
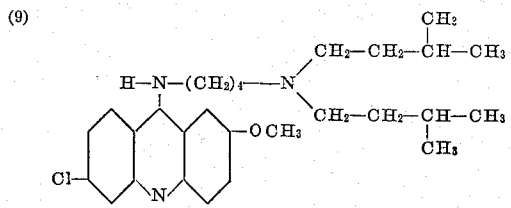

d. The dihydrochloride of c.

*Example 4.*—2-methoxy-6-chloro-9-[4'-(dicyclohexylamino)butylamino]acridine and its dihydrochloride.

Example 1 is repeated, save that as the starting secondary amine we use dicyclohexylamine; and successively obtain the following compounds:
a. 4-(dicyclohexylamino)butyronitrile
b. 4-(dicyclohexylamino)butylamine
c. 2-methoxy - 6 - chloro-9-[4'-(dicyclohexylamino)butylamino]acridine, which has the following formula:

(10)
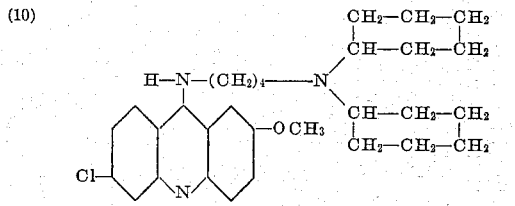

d. The dihydrochloride of c.

*Example 5.*—2-methoxy-6-chloro-9-[4'-(di-1"-methylhexylamino)butylamino]acridine and its dihydrochloride.

Example 1 is repeated, save that as the starting secondary amine we use di-1-methylhexylamine; and successively obtain the following compounds:
a. 4-(di-1'-methylhexylamino)butyronitrile
b. 4-(di-1'-methylhexylamino)butylamine
c. 2 - methoxy-6-chloro-9-[4'-(di-1"-methylhexylamino)butylamino]acridine, which has the following formula:

(11)
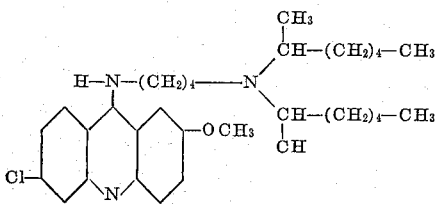

d. The dihydrochloride of c.

*Example 6.*—Example 1 may be repeated, using other secondary amines as starting compounds, to produce corresponding 4-(disubstituted amino)butyronitriles, 4-(disubstituted amino)butylamines, and 2-methoxy-6-chloro-9-[4'-(disubstituted amino)]acridines and their dihydrochlorides.

*Example 7.*—Any of the preceding examples may be repeated, save that instead of converting the final substituted acridine to its dihydrochloride, we may form the dihydrobromide or other salts thereof, such for instance as the sulfate, the nitrate, the phosphate, the lactate, the propionate, etc.

Compounds of the type shown in Formula 1 above, and produced by the procedures of the various examples given above, have antimalarial value, either directly or in the form of salts of various acids.

We claim as our invention:

2-methoxy - 6 - chloro-9-[4'-(diisopropylamino)-butylamino]-acridine having the following formula:

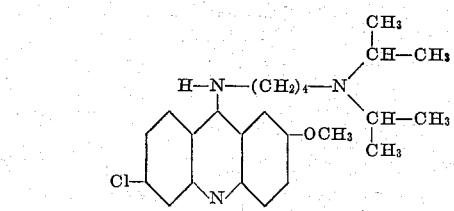

and its salts.

HORACE A. SHONLE.
JOSEPH W. CORSE.

REFERENCES CITED

The following references are of record in the file of this patent:

UNITED STATES PATENTS

| Number | Name | Date |
|---|---|---|
| 1,992,615 | Hoffman | Feb. 26, 1930 |
| 2,113,357 | Mietzsch et al. | Apr. 5, 1938 |
| 2,160,058 | Cover | May 30, 1939 |

OTHER REFERENCES

Organic Syntheses, vol. 23, pages 23 and 24 (John Wiley & Sons Inc., New York, N. Y.; 1943).

J. American Chemical Society, vol. 65, pages 2012–2015 (1943).

Helvitica Chimica Acta, vol. 26, pages 1172–1180 (1943).

Williams: "Chemotherapy of Malaria" (published by Lederle Laboratories, New York, June 1941), pages 196, 197, and 216–219.